(12) United States Patent
Bybee et al.

(10) Patent No.: US 7,857,930 B2
(45) Date of Patent: Dec. 28, 2010

(54) FLEXIBLE BARRIER FILM STRUCTURE

(75) Inventors: Cary R. Bybee, Lebanon, OR (US); Paul L. Nash, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 11/865,948

(22) Filed: Oct. 2, 2007

(65) Prior Publication Data

US 2008/0017302 A1     Jan. 24, 2008

Related U.S. Application Data

(62) Division of application No. 10/392,598, filed on Mar. 17, 2003, now Pat. No. 7,294,400.

(51) Int. Cl.
*B29C 65/54* (2006.01)

(52) U.S. Cl. ............... 156/182; 156/244.11; 156/331.7; 428/423.5; 428/423.7; 428/424.8; 428/425.9

(58) Field of Classification Search ................ 156/182, 156/244.11, 331.7; 428/423.7, 425.8, 423.5, 428/424.8, 425.9
See application file for complete search history.

(56) References Cited

U.S. PATENT DOCUMENTS

| | | | |
|---|---|---|---|
| 4,551,517 A * | 11/1985 | Herold et al. ................. | 528/60 |
| 5,558,930 A | 9/1996 | DiPoto et al. | |
| 5,734,401 A | 3/1998 | Clark et al. | |
| 5,853,862 A | 12/1998 | Murai et al. | |
| 5,854,646 A | 12/1998 | Barinaga et al. | |
| 5,856,839 A | 1/1999 | Aukstikainis et al. | |
| 5,942,320 A | 8/1999 | Miyake et al. | |
| 6,010,757 A | 1/2000 | Yamamoto et al. | |
| 6,053,971 A * | 4/2000 | Lin ........................ | 106/287.23 |
| 6,749,940 B1 * | 6/2004 | Terasaki et al. .......... | 428/425.8 |
| 6,872,459 B1 * | 3/2005 | Frisk et al. ............... | 428/474.4 |

FOREIGN PATENT DOCUMENTS

| WO | WO01/19611 | * | 3/2001 |
|---|---|---|---|
| WO | WO01/89826 | * | 11/2001 |

* cited by examiner

*Primary Examiner*—Kat Wyrozebski
*Assistant Examiner*—Scott W Dodds

(57) ABSTRACT

A flexible barrier film, including a polyester layer, and a vapor barrier film having a base layer and an inorganic layer disposed on the base layer, and a heat sealable layer having polyethylene. In addition, the flexible barrier film includes a first adhesive layer having a polyurethane component, interposed between the polyester layer and the vapor barrier film, and further includes a second adhesive layer having a polyurethane component that is interposed between the vapor barrier film and the heat sealable film forming the flexible barrier film.

14 Claims, 3 Drawing Sheets

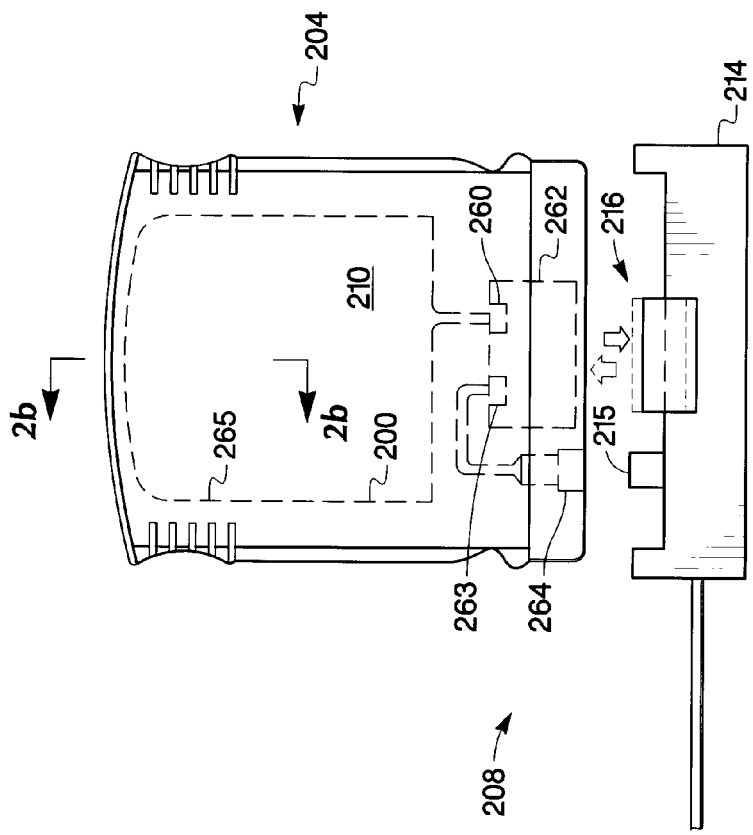
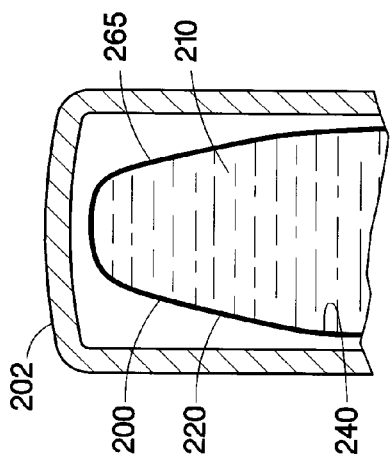
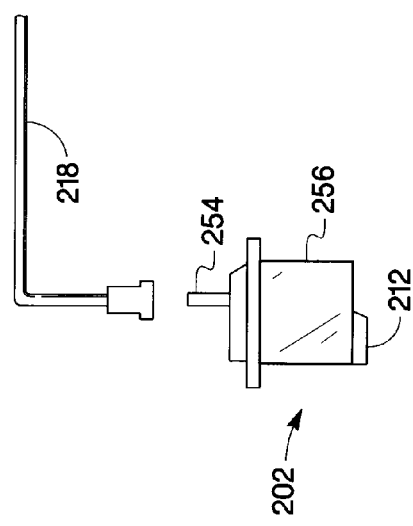

FLEXIBLE BARRIER FILM STRUCTURE

CROSS-REFERENCE TO RELATED APPLICATIONS

This application is a divisional application and claims the benefit and priority of U.S. patent application Ser. No. 10/392,598 filed Mar. 17, 2003 now U.S. Pat. No. 7,294,400.

BACKGROUND

Description of the Art

Over the past decade, substantial developments have been made in the micro-manipulation of fluids in fields such as electronic printing technology using inkjet printers. As the volume of fluid manipulated or ejected decreases the susceptibility to air or gas bubbles forming in the firing chamber or in other fluid channels increases. In addition, the ability to maintain a uniform pressure, within various fluid channels and chambers, is also made more difficult. Further the susceptibility to clogging, of fluid channels and nozzles, also increases. Inkjet printing systems provide a good example of the problems facing the practitioner in preventing the formation of gas bubbles in microfluidic channels and chambers.

Currently there is a wide variety of highly efficient inkjet printing systems in use, which are capable of dispensing ink in a rapid and accurate manner. However, there is a demand by consumers for ever-increasing improvements in speed and image quality. In addition, there is also increasing demand by consumers for longer lasting fluid ejection cartridges. One way to increase the speed of printing is to move the print or fluid ejection cartridge faster across the print medium. However, if the fluid ejection cartridge includes both the fluid reservoir and energy generating elements then longer lasting print cartridges typically would require larger ink reservoirs with the corresponding increase in mass associated with the additional ink. This increase in mass, typically, requires more costly and complex mechanisms to move at even higher speeds to produce the increased printing speed. For color printers, generally requiring at least three color cartridges and sometimes a fourth black ink cartridge, this increase in mass is further exacerbated by requiring three or four ink reservoirs.

Thus, in an effort to reduce the cost and size of ink jet printers and to reduce the cost per printed page, printers have been developed having small, moving printheads that are connected to large stationary ink supplies. This development is called "off-axis" printing and has allowed the large ink supplies to be replaced as it is consumed without requiring the frequent replacement of the costly printhead containing the fluid ejectors and nozzle system. However, the typical "off-axis" system requires numerous flow restrictions between the ink supply and the printhead, such as additional orifices, long narrow conduits, and shut off valves. To overcome these flow restrictions and to also provide ink over a wide range of printing speeds, ink is now generally transported to the printhead at an elevated pressure. A pressure regulator is typically added to deliver the ink to the printhead at the optimum backpressure. Further, an "off-axis" printing system strives to maintain the backpressure of the ink within the printhead to within as small a range as possible. Typically, changes in back pressure, of which air bubbles are only one source, may greatly effect print density as well as print and image quality.

In addition, improvements in image quality have led to an increase in the complexity of ink formulations that increases the sensitivity of the ink to the ink supply and print cartridge materials that come in contact with the ink. Typically, these improvements in image quality have led to an increase in the organic content of inkjet inks that results in a more corrosive environment experienced by the materials utilized thus raising material compatibility issues.

In order to reduce both weight and cost many of the materials currently utilized are made from polymers such as plastics and elastomers. Many of these plastic materials, typically, utilize various additives, such as stabilizers, plasticizers, tackifiers, polymerization catalysts, and curing agents. These low molecular weight additives are typically added to improve various processes involved in the manufacture of the polymer and to reduce cost without severely impacting the material properties. Since these additives, typically, are low in molecular weight compared to the molecular weight of the polymer, they can leach out of the polymer by the ink, react with ink components, or both, more easily than the polymer itself causing such problems. In either case, the reaction between these low molecular weight additives and ink components can also lead to the formation of precipitates or gelatinous materials, which can further result in degraded print or image quality.

If these problems persist, the continued growth and advancements in inkjet printing and other micro-fluidic devices, seen over the past decade, will be reduced. Consumer demand for cheaper, smaller, more reliable, higher performance devices constantly puts pressure on improving and developing cheaper, and more reliable manufacturing materials and processes. The ability to optimize fluid ejection systems, will open up a wide variety of applications that are currently either impractical or are not cost effective.

BRIEF DESCRIPTION OF THE DRAWINGS

FIG. 2a is a schematic representation of a fluid supply including a barrier film according to an embodiment of the present invention;

FIG. 2b is an expanded cross-sectional view of a portion of the fluid container shown in FIG. 2a according to an embodiment of the present invention;

DESCRIPTION OF THE PREFERRED EMBODIMENTS

Figure 1B:
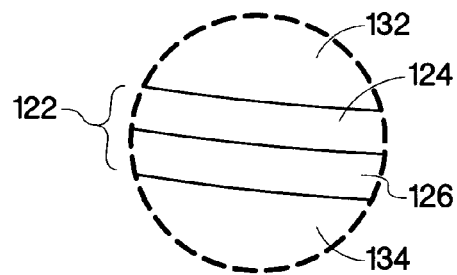
FIG. 1b is an expanded cross-sectional view of a vapor barrier film of the barrier film shown in FIG. 1a according to an embodiment of the present invention.
Figure 1A:
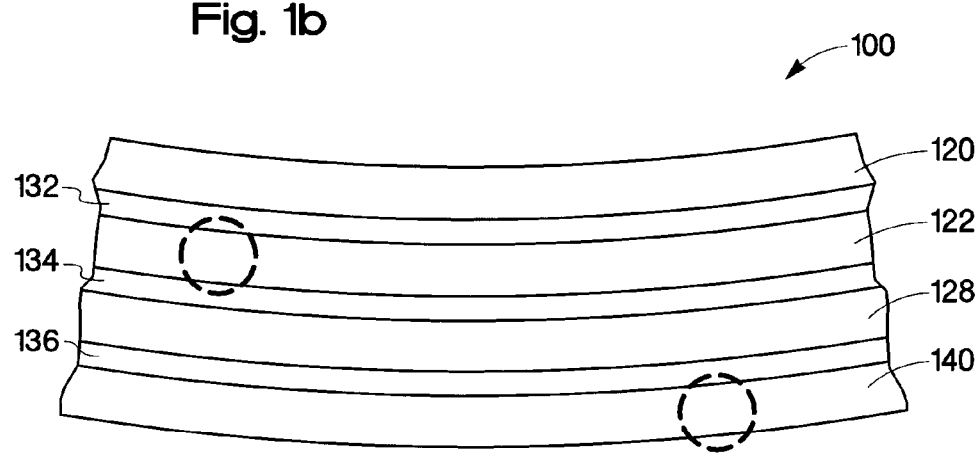
FIG. 1a is a cross-sectional view of a barrier film according to an embodiment of the present invention.

Referring to FIG. 1a, an exemplary embodiment of flexible barrier film 100 of the present invention is shown in a cross-sectional view. In this embodiment, barrier film 100 includes polyester layer 120, vapor barrier film 122 providing an air and moisture barrier, and heat sealable film 140 to form an asymmetric fluid-air barrier film. In this embodiment, polyester adhesive layer or first adhesive layer 132 bonds polyester layer 120 and vapor barrier film 122. Barrier film 100 also includes polyamide layer 128 interposed between vapor barrier film 122 and heat sealable film 140 where vapor barrier adhesive layer or second adhesive layer 134 bonds vapor barrier film 122 and polyamide layer 128. Heat sealable adhesive layer or third adhesive layer 136 bonds polyamide layer 128 and heat sealable film 140 forming a barrier film having seven major layers. Polyester adhesive layer 132, in this embodiment, is a polyurethane adhesive that includes a polyol component and a toluenediisocyanate component. Vapor barrier adhesive layer 134 and heat sealable adhesive layer 136, in this embodiment, are polyurethane adhesives that include a polyol component and a diphenylmethanediisocyanate component. In this embodiment polyester layer 120 is a polyethylene terephthalate (PET) layer, however, in alternate embodiments, other polyesters may also be utilized. An example of a commercially available polyester material that may be utilized is sold by E.I. DuPont de Nemours & Co, under the name Mylar.

It should be noted that the drawings are not true to scale. Further, various elements have not been drawn to scale. Certain dimensions have been exaggerated in relation to other dimensions in order to provide a clearer illustration and understanding of the present invention.

In addition, although some of the embodiments illustrated herein are shown in two dimensional views with various regions having depth and width, it should be clearly understood that these regions are illustrations of only a portion of a device that is actually a three dimensional structure. Accordingly, these regions will have three dimensions, including length, width, and depth, when fabricated on an actual device. Moreover, while the present invention is illustrated by various embodiments, it is not intended that these illustrations be a limitation on the scope or applicability of the present invention. Further it is not intended that the embodiments of the present invention be limited to the physical structures illustrated. These structures are included to demonstrate the utility and application of the present invention.

An expanded cross-sectional view of vapor barrier film 122 is shown in FIG. 1b, and shows that vapor barrier film 122 includes base layer 126 and inorganic layer 124. In this embodiment base layer 126, is a polyester and is formed from polyethylene terephthalate, however, in alternate embodiments, other polyesters as well as other polymeric base films may also be utilized. In this embodiment, inorganic layer 124 is a thin aluminum oxide layer vapor deposited on base polyester layer 126. An example of a commercially available vapor barrier film that may be utilized is sold by Toppan Printing Co. Ltd. under the name GL-AE. However, in alternate embodiments, inorganic layer 124 may include any of the various metal oxides, nitrides, carbides, borides, or suicides, and combinations thereof, such as silicon oxide, tin oxide, titanium nitride, silicon carbide, chromium boride, and silicon oxynitride to name just a few examples. In still other embodiments, inorganic layer 124 may be a metal layer. A few examples of various metals that may be utilized include aluminum, silicon, tungsten, tantalum, chromium, titanium, germanium, tin, vanadium, molybdenum, niobium, barium, cesium, potassium, magnesium and combinations thereof. Both the particular material utilized in, and the thickness of, inorganic layer 124 will depend on the particular application in which vapor barrier film 122 will be utilized, and will depend on, for example, the desired flexibility, the desired water vapor transmission rate, the desired oxygen permeation rate, as well as the particular fluid being utilized.

Figure 1C:
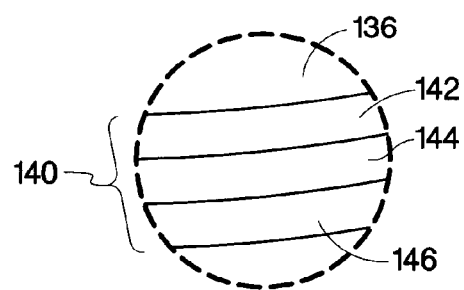
FIG. 1c is an expanded cross-sectional view of a heat sealable film of the barrier film shown in FIG. 1a according to an embodiment of the present invention.

An expanded cross-sectional view of heat sealable film 140 is shown in FIG. 1c, and shows heat sealable film 140 includes first polyethylene (PE) layer 142, metallocene polyethylene (m-PE) layer 144 and second PE layer 146. In this embodiment, first PE layer 142 includes 66.1 weight percent of a hexene or C6 derived linear low density polyethylene, 22.4 weight percent of a low density polyethylene, 10.5 weight percent of titanium dioxide filler, and 1 weight percent of processing aids such as fluorocarbons. In alternate embodiments, the linear low density polyethylene may be derived from a C4 to C6 alkene such as butene, pentene, hexene, heptene and octene to name a few. In such alternate embodiments, the first PE layer may utilize a C4 to C6 derived linear low density polyethylene in the range from about 50 weight percent to about 80 weight percent, a low density polyethylene in the range from about 15 weight percent to about 30 weight percent, a colorant in the range of about 0.1 weight percent to about 15 weight percent, and processing aids in the range from about 0.1 weight percent to about 5 weight percent. In this embodiment, second PE layer 146 includes 65.9 weight percent of a C6 derived linear low density polyethylene, 23.1 weight percent of a low density polyethylene, 8.0 weight percent of erucamide (cis 13-docosenoic amide or z-13-docosenamide), 2.0 weight percent silica acid antiblock agent, and 1 weight percent of processing aids such as fluorocarbons. In alternate embodiments, second PE layer may also utilize a C4-C8 derived linear low density polyethylene in the range from about 50 weight percent to about 80 weight percent, a low density polyethylene in the range from about 15 weight percent to about 30 weight percent, slip agents in the range from about 5 weight percent to about 15 weight percent, and processing aids in the range from about 0.1 weight percent to about 5 weight percent.

Still referring to FIG. 1c, m-PE layer 144, in this embodiment, includes 50.0 weight percent of a C6 derived linear low density polyethylene, 19.0 weight percent of a low density polyethylene, 19.5 weight percent of a metallocene low density polyethylene, 10.5 weight percent titanium dioxide, and 1 weight percent of processing aids such as fluorocarbons. In alternate embodiments, m-PE layer 144 may also utilize a C4-C8 linear low density polyethylene in the range from about 40 weight percent to about 60 weight percent, a low density polyethylene in the range from about 15 weight percent to about 30 weight percent, a metallocene low density polyethylene in the range from about 15 weight percent to about 30 weight percent, a colorant in the range of about 0.1 weight percent to about 15 weight percent, and processing aids in the range from about 0.1 weight percent to about 5 weight percent. An example of a commercially available C6 derived linear low density polyethylene material that may be utilized is sold by Dow Plastics, under the name Dowlex. An example of a commercially available low-density polyethylene material that may be utilized is sold by Dow, Exxon, and others. An example of a metallocene linear low density polyethylene that may be utilized is Innovex LL6208AF-PT sold by British Petroleum.

Polyester layer 120, in this embodiment, is formed with a thickness of about 8 micrometers, however in alternate embodiments, a thickness less than about 15 microns may also be utilized. Each adhesive layer is formed with a thickness in the range of about 3 micrometers to about 12 micrometers. Vapor barrier film 122 is formed with a thickness of about 12 micrometers, however, in alternate embodiments, a thickness less than about 20 micrometers may also be utilized. Polyamide layer 128, in this embodiment, is formed with a thickness of about 20 micrometers, however, in alternate embodiments, a thickness in the range from about 15 micrometers to about 25 micrometers may also be utilized. Heat sealable film 140, in this embodiment is formed by blown co-extrusion with a thickness of about 75 micrometers, however, in alternate embodiments a thickness in the range from about 50 micrometers to about 100 micrometers may also be utilized. In addition, in this embodiment barrier film 100 has an oxygen transmission rate of less than 0.1 centimeter cubed per meter squared times 24 hours times bar (at 25°

C. and 75 percent relative humidity). However, in alternate embodiments, barrier film 100 may have an oxygen transmission rate less than 0.075 centimeters cubed per meter squared times 24 hours times bar (at 25° C. and 50 to 100 percent relative humidity) based on ASTM: Oxtran F-1927-98 test method. Further, barrier film 100 has a water vapor transmission rate, in this embodiment, of less than 0.5 grams per meter squared times 24 hours (at 38° C. and 0/90 percent relative humidity). However, in alternate embodiments, barrier film 100 may have a water vapor transmission rate less than 0.35 grams per meter squared times 24 hours (at 38° C. and 0/90 percent relative humidity) based on ASTM: F-1249-0 test method.

Referring to FIG. 2a an exemplary embodiment of barrier film 200 utilized in fluid supply system 208 of the present invention is shown in a schematic representation. In this embodiment, fluid supply system 208 includes fluid container 204 that includes fluid supply reservoir 210 that holds a fluid contained within flexible bag 265. Flexible bag 265 is formed from barrier film 200 as shown in a cross-sectional view in FIG. 2b. In this embodiment, barrier film 200 is folded to have heat sealable film 140 on the inside or fluid side of flexible bag 265. The internal volume of flexible bag 265 is fluidically coupled to inlet 260 for selectively allowing fluid to pass from supply reservoir 210 to diaphragm pump portion 262. Flexible bag 265 in this embodiment is filled with fluid and air occupies the volume of the container that is not taken up by flexible bag 265, however, in alternate embodiments, barrier film 200 may be formed or folded or both in a different manner such as sealing the heat sealable portion against the inside surface of fluid container 204. Diaphragm pump portion 262 provides control of fluid flowing from fluid container 204 to cartridge reservoir 256 disposed in fluid ejection cartridge 202. Fluid supply system 100 also includes supply station 214 for receiving fluid container 204. Supply station 214 is fluidically coupled to fluid ejection cartridge 202 by conduit 218.

Fluid container 204 also includes fluid outlet 263 for selectively allowing fluid to pass from diaphragm pump portion 262 to container outlet 264. Supply station 214 includes station inlet 215 and pump actuator 216. With fluid container 204 properly positioned in supply station 214 container outlet 264 fluidically connects with station inlet 215. In addition, proper positioning of fluid container 204 in supply station 214 also allows pump actuator 216 to engage diaphragm pump portion 262. This engagement between pump actuator 216 and diaphragm pump portion 262 generates the mechanical motion to impart sufficient energy to the fluid to cause fluid from fluid supply reservoir 210 to flow to fluid ejection cartridge 202. Diaphragm pump portion 262 and actuator 216 ensure a substantially constant supply of fluid to fluid ejection cartridge 202 as fluid is expelled out of nozzles (not shown) disposed on fluid ejector head 212 when a fluid ejector actuator, located on fluid ejector head 212, is activated. In this embodiment, the fluid ejector actuator (not shown) is a thermal resistor; however, other fluid ejectors may also be utilized such as piezoelectric, flex-tensional, acoustic, and electrostatic.

Figure 3:
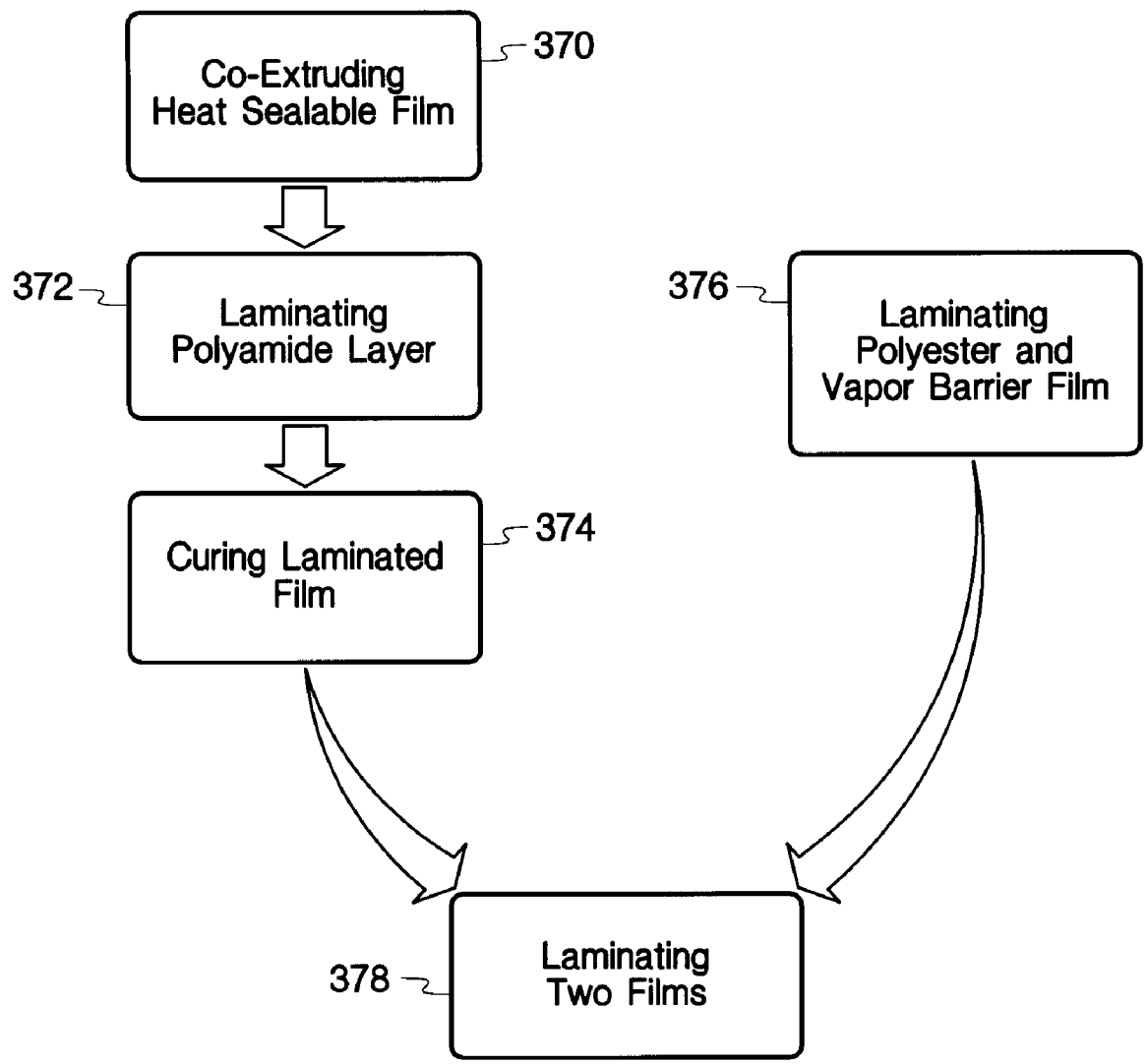
FIG. 3 is flow chart of a process of making a barrier film according to an embodiment of the present invention.

Referring to FIG. 3, a flow diagram of a method of manufacturing a flexible barrier film according to an embodiment of the present invention is shown. Co-extruding heat sealable film process 370 is utilized to form heat sealable film 140 shown in FIG. 1a and 1c. First polyethylene (PE) layer 142, metallocene polyethylene (m-PE) layer 144 and second PE layer 146 are co-extruded utilizing conventional co-extrusion equipment. The three separate melts are formed into sheet of film with the aid of hot air and automated film winders. After the film is extruded it may be corona treated to improve adhesion during subsequent processing. Polyamide layer lamination process 372 is utilized to laminate polyamide film 128 to the heat sealable film utilizing a polyurethane adhesive that includes a polyol component and a diphenylmethanediisocyanate component, shown in FIG. 1a as heat sealable adhesive layer 136. Curing laminated film process 374 is utilized to cure the laminated polyamide/adhesive/heat sealable film at about 60° C. for 14 days. Laminating polyester and vapor barrier film process 376 is utilized to laminate vapor barrier film 122 to polyester film 120 using a polyurethane adhesive that includes a polyol component and a toluenediisocyanate component, shown in FIG. 1a as polyester adhesive layer 132. Laminating two films process 378 is utilized to laminate the cured laminated film and the polyester vapor barrier film laminate together to form the multi-layered asymmetric barrier film utilizing a polyurethane adhesive that includes a polyol component and a diphenylmethanediisocyanate component, shown in FIG. 1a as vapor barrier adhesive layer 134.

What is claimed is:

1. A method of making a flexible barrier film, comprising:
co-extruding a heat sealable film;
laminating a polyester layer to a first side of a vapor barrier film utilizing a first polyurethane adhesive to form a first laminated film, said vapor barrier film having a base polyester layer and an inorganic layer disposed on a first side of said base polyester layer, said laminating including laminating said polyester layer to said inorganic layer of said vapor barrier film;
laminating a second side of a polyamide film to said heat sealable film utilizing a second polyurethane adhesive to form a second laminated film; and
laminating said first laminated film and said second laminated film utilizing a third polyurethane adhesive to form the barrier film, said laminating including laminating a second side of said vapor barrier film to a first side of said polyamide film.

2. The method in accordance with claim 1, wherein co-extruding said heat sealable film further comprises co-extruding first and second polyethylene layers having a low density polyethylene and a linear low density polyethylene and a third polyethylene layer having a metallocene low density polyethylene interposed between said first and second polyethylene layers to form said heat sealable film,
wherein laminating said polyamide film to said heat sealable film further comprises laminating said second side of said polyamide film to said first polyethylene layer.

3. The method in accordance with claim 1, further comprising after co-extruding said heat sealable film and before laminating said polyamide film to said heat sealable film, corona treating said heat sealable film.

4. The method in accordance with claim 1, wherein said second polyurethane adhesive includes a polyol component and a diphenylmethanediisocyanate component.

5. The method in accordance with claim 1, wherein said third polyurethane adhesive includes a polyol component and a diphenylmethanediisocyanate component.

6. The method in accordance with claim 1, wherein said first polyurethane adhesive includes a polyol component and a toluenediisocyanate component.

7. The method in accordance with claim 1, further comprising before laminating said first laminated film and said second laminated film, curing said second laminated film for about 14 days at about 60° C.

8. The method in accordance with claim 1, wherein laminating said polyester layer to said vapor barrier film further comprises laminating a polyester layer having polyethylene terephthalate to said first side of said vapor barrier film.

9. The method in accordance with claim 1, wherein laminating said first laminated film and said second laminated film further comprises laminating a second side of said base polyester layer of said vapor barrier film to said first side of said polyamide film.

10. The method in accordance with claim 1, wherein the barrier film has an oxygen transmission rate of less than 0.1 centimeter cubed per meter squared times 24 hours times bar at 25° C. and 75 percent relative humidity.

11. The method in accordance with claim 1, wherein the barrier film has a water vapor transmission rate of less than 0.5 grams per meter squared times 24 hours at 38° C. and 0/90 percent relative humidity.

12. A method of making a barrier film, comprising:
co-extruding first and second polyethylene layers having a low density polyethylene and a linear low density polyethylene and a third polyethylene layer having a metallocene low density polyethylene interposed between said first and second polyethylene layers to form a heat sealable film;
laminating a polyethylene terephthalate layer to a first side of a vapor barrier film utilizing a first polyurethane adhesive to form a first laminated film, said vapor barrier film having a base polyethylene terephthalate layer and an inorganic layer disposed on a first side of said base polyethylene terephthalate layer, said first polyurethane adhesive having a toluenediisocyanate component, and said laminating including laminating said polyethylene terephthalate layer to said inorganic layer of said vapor barrier film;
laminating a second side of a polyamide film to said heat sealable film utilizing a second polyurethane adhesive to form a second laminated film, said second polyurethane adhesive having a diphenylmethanediisocyanate component, and said laminating including laminating said second side of said polyamide film to said first polyethylene layer of said heat sealable film; and
laminating said first laminated film and said second laminated film utilizing a third polyurethane adhesive to form the barrier film, said third polyurethane adhesive having a diphenylmethanediisocyanate component, and said laminating including laminating a second side of said base polyethylene terephthalate layer of said vapor barrier film to a first side of said polyamide film.

13. The method in accordance with claim 12, further comprising before laminating said polyamide film to said heat sealable film, corona treating said heat sealable film.

14. The method in accordance with claim 12, further comprising before laminating said first laminated film and said second laminated film, curing said second laminated film for about 14 days at about 60° C.

* * * * *